United States Patent
Gulati et al.

(10) Patent No.: US 7,201,965 B2
(45) Date of Patent: Apr. 10, 2007

(54) GLASS LAMINATE SUBSTRATE HAVING ENHANCED IMPACT AND STATIC LOADING RESISTANCE

(75) Inventors: Suresh Thakordas Gulati, Elmira Heights, NY (US); Josef Chauncey Lapp, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/011,323

(22) Filed: Dec. 13, 2004

(65) Prior Publication Data

US 2006/0127679 A1  Jun. 15, 2006

(51) Int. Cl.
*B32B 17/06* (2006.01)
*C09K 19/00* (2006.01)

(52) U.S. Cl. .............. 428/426; 428/1.1; 428/1.62; 428/1.52

(58) Field of Classification Search .......... 428/426, 428/427, 428, 697, 699, 701, 702, 446, 448, 428/1.1, 1.5, 1.51
See application file for complete search history.

(56) References Cited

U.S. PATENT DOCUMENTS

| | | | |
|---|---|---|---|
| 3,597,305 A | 8/1971 | Giffen | |
| 3,673,049 A | 6/1972 | Giffen et al. | 161/164 |
| 3,746,526 A | 7/1973 | Giffon | |
| 3,849,097 A * | 11/1974 | Giffen et al. | 65/33.5 |
| 3,958,052 A * | 5/1976 | Galusha et al. | 428/68 |
| 4,102,644 A | 7/1978 | Hauser et al. | 8/164 |
| 4,214,886 A | 7/1980 | Shay et al. | 65/121 |
| 4,999,246 A | 3/1991 | Jechel et al. | 428/192 |
| 5,044,350 A | 9/1991 | Iwabuchi et al. | 124/51.1 |
| 5,342,426 A | 8/1994 | Dumbaugh, Jr. | 65/23 |
| 5,831,694 A | 11/1998 | Onisawa et al. | 349/43 |
| 5,880,795 A | 3/1999 | Nagata et al. | 349/58 |
| 6,049,094 A | 4/2000 | Penry | 257/99 |
| 6,083,313 A | 7/2000 | Venkatraman et al. | 106/287.14 |
| 6,252,639 B1 | 6/2001 | Giannatto | 349/58 |
| 6,309,901 B1 | 10/2001 | Tahon et al. | 438/29 |
| 6,353,283 B1 | 3/2002 | Ghosh et al. | 313/477 |
| 6,356,334 B1 | 3/2002 | Mathew et al. | 349/153 |
| 6,361,867 B2 | 3/2002 | Kishida et al. | 428/428 |
| 6,400,439 B1 | 6/2002 | Fujioka et al. | 349/153 |
| RE37,920 E | 12/2002 | Moffatt et al. | 501/69 |
| 6,660,387 B2 | 12/2003 | Oaku et al. | 428/415 |

FOREIGN PATENT DOCUMENTS

| | | |
|---|---|---|
| JP | 06-175143 | 6/1994 |
| JP | 2000-016840 | 1/2000 |
| JP | 2003-048764 | 2/2003 |

* cited by examiner

*Primary Examiner*—Jennifer McNeil
*Assistant Examiner*—Elizabeth D. Ivey
(74) *Attorney, Agent, or Firm*—Christopher Nicastri; Brian B. Shaw

(57) ABSTRACT

A glass laminate substrate for electronic substrates, such as flat panel displays, includes a transparent glass core bounded by transparent glass skin layers, wherein the coefficient of thermal expansion of the core is greater than the coefficient of thermal expansion of the skin layers thereby forming a residual compressive stress in the skin layers and a residual tensile stress in the core. The relative thickness of the skin layers can be selected to enhance the strength of the glass laminate substrate while maintaining a sufficiently low residual tensile stress in the core to allow scribing and separating of the substrate to size. Interlayers can be located between the core and the skin layers, wherein the interlayers include a residual compressive stress, and produce a reduced residual tensile stress in the core.

29 Claims, 3 Drawing Sheets

GLASS LAMINATE SUBSTRATE HAVING ENHANCED IMPACT AND STATIC LOADING RESISTANCE

BACKGROUND OF THE INVENTION

1. Field of the Invention

The present invention relates to electronic substrates and, more particularly, to a glass laminate substrate, such as for example use in flat panel displays, wherein selected layers in the substrate include a residual compressive stress or a residual tensile stress to enhance static and impact loading resistance of the substrate.

2. Description of Related Art

Glass substrates are often used in displays, such as for example liquid crystal displays (LCDs). LCDs have become increasingly popular for displaying information in calculators, watches, video games, audio and video equipment, portable computers and even car dashboards. The improving quality and size of LCDs has made the LCDs an attractive alternative to cathode ray tubes (CRTs) which are traditionally used in television sets and desktop computer displays. In addition, other flat panel display (FPD) types, such as plasma displays (PDs), field emission displays (FEDs) and organic light-emitting polymer displays (OLEDs) are being developed as alternatives to LCDs.

In certain FPDs, two glass plates are used to carry functional layers, such as electro conductive layers for pixel addressing, color filters, liquid crystal orientation or alignment layers in LCDs or phosphor layers in FEDs and PDs. Between the two glass plates having the functional layers, a liquid crystal compound (LCDs), a light-emitting polymer (OLEDs) or a plasma-forming gas (PDs) is disposed.

The replacement of glass plates by plastic sheets is disclosed in Japanese Patent Laid-open No. 6-175143. Plastic sheets can be made thinner than glass sheets on account of their flexibility (hence providing good crack resistance) and resistance to impact and static loading. Plastic sheets also have a lower specific gravity than glass sheets, and thus an LCD with a plastic substrate is lighter and thinner than that with a glass substrate.

Unfortunately, plastic sheets have three properties that limit their application in displays: a lower glass transition temperature, a lower transmission for visible light and a higher rate of gas permeability than glass sheets. The lower glass transition temperature limits the maximum use temperature of the plastic sheet. Thus, the plastic sheets will thermally decomposed when exposed to the high, 300–600° C. temperatures required for the manufacture of a-Si or p-Si based TFTs of the kind used in LCD and OLED displays. The lower optical transmissivity reduces picture brightness. The gas permeability of a plastic sheet can lead to degradation of the organic light emitting materials used in OLED displays. Such limitations restrict the application of plastic sheets in displays.

Therefore, the need remains for a glass laminate substrate which can offer the advantages of glass sheets in conjunction with enhanced strength. The need also exists for an enhanced strength glass laminate substrate that can be formed in bulk and subsequently reduced to size without incurring significant loss due to scrap. A further need exists for a glass laminate substrate that can have reduced thickness, and hence reduced weight, while providing enhanced resistance to loading forces. A need also exists for a glass laminate substrate having a substantially predetermined resistance to impact and static loading.

SUMMARY OF THE INVENTION

The present invention provides a glass laminate substrate, wherein the substrate has increased resistance to impact and static loading, while providing the benefits of glass sheets. The glass laminate substrate includes selected layers having a residual compressive or a residual tensile stress to enhance the loading resistance of the substrate.

The glass laminate substrate can be used as an electronic substrate such as, but not limited to, focal plane arrays, opto-electronic devices, photovoltaic cells, optical devices, flat panel displays, and integrated circuits at both wafer and assembly stage.

Generally, the glass laminate substrate includes a transparent glass core and a pair of transparent glass skin layers, wherein the core has a higher coefficient of thermal expansion than the skin layers. The relative thickness of the core with respect to the skin layers and the coefficients of thermal expansion are selected to generate a residual compressive stress in the skin layers and a residual tensile stress in the core. The residual stresses increase the loading resistance of the substrate. The compressive stress in the skin layers and the tensile stress in the core can be selected to permit subsequent scribing and separating of the substrate without incurring unacceptable levels of substrate breakage or debris generation.

In one configuration, a glass laminate substrate can be employed for example in a flat panel display, wherein the substrate includes a pair of spaced transparent glass skin layers having a first coefficient of thermal expansion; and a transparent glass core intermediate the skin layers, the transparent glass core having a higher second coefficient of thermal expansion, such that the glass skin layers have a residual compressive stress greater than approximately 1,000 psi (6.9 MPa) and the glass core has a residual tensile stress less than approximately 4,000 psi (27.6 MPa).

In some constructions, the glass laminate substrate is selected to retain at least approximately 4,000 psi (27.6 Mpa) of compressive stress in the skin layers and less than approximately 1,000 psi (6.9 Mpa) tensile stress in the core.

In further configurations, the glass laminate substrate includes at least one glass interlayer located between the skin layer and the core. By selecting the respective setpoints and coefficients of thermal expansion of the glass which forms the skin layers, the interlayers and the core, the residual tensile stress in the core can be reduced, while maintaining, or increasing, the residual compressive stress in the skin layers.

The residual compressive stress in the skin layers and the residual tensile stress in the glass core create a stored energy in the glass laminate substrate that provides a resistance to both flaw creation and flaw propagation, wherein the stored energy is sufficiently low to allow scribing and separating of the substrate without substrate failure or adverse generation of contaminating glass debris such as particles or fragments.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description serve to explain the principles and operations of the invention.

DETAILED DESCRIPTION OF THE INVENTION

Figure 3:
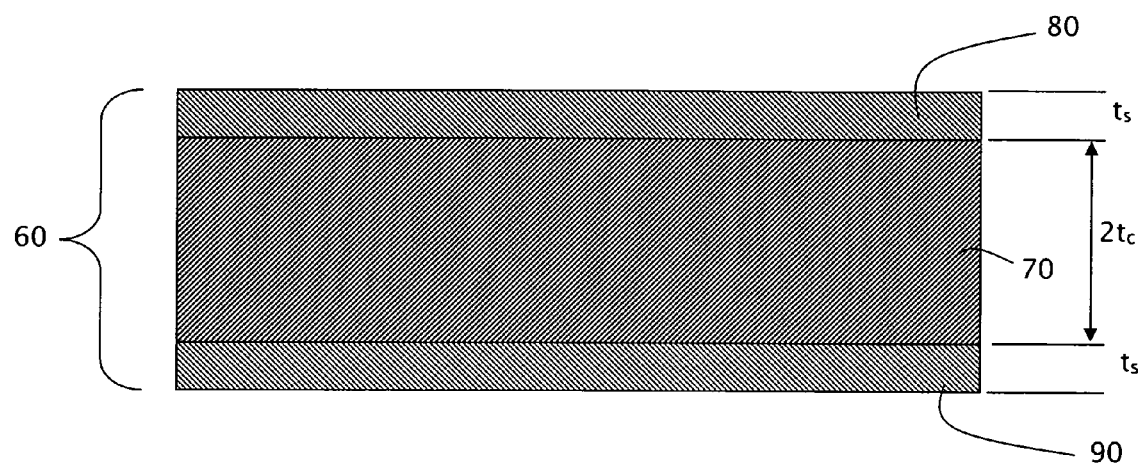
FIG. 3 is a cross sectional view of a glass laminate substrate made in accordance with the present invention, such as for flat panel displays.
Figure 4:
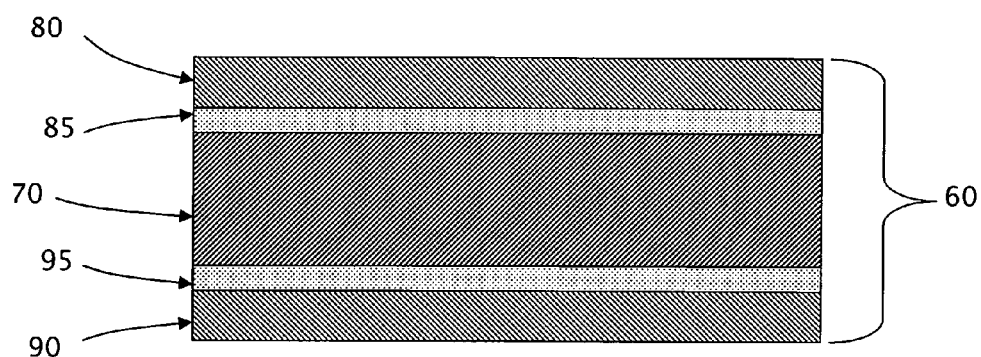
FIG. 4 is a cross sectional view of a further exemplary configuration of a glass laminate substrate of the present invention having interlayers.

The present invention includes a glass laminate substrate 60 (such as shown in the examples of FIGS. 3 and 4) for use in flat panel displays. As used herein, the term "flat panel display" is an example of an electronic substrate and can include, but is not limited to liquid crystal displays (LCDs), plasma displays, (PDs), field emission displays (FEDs) and organic light-emitting polymer displays (OLEDs).

Figure 1:
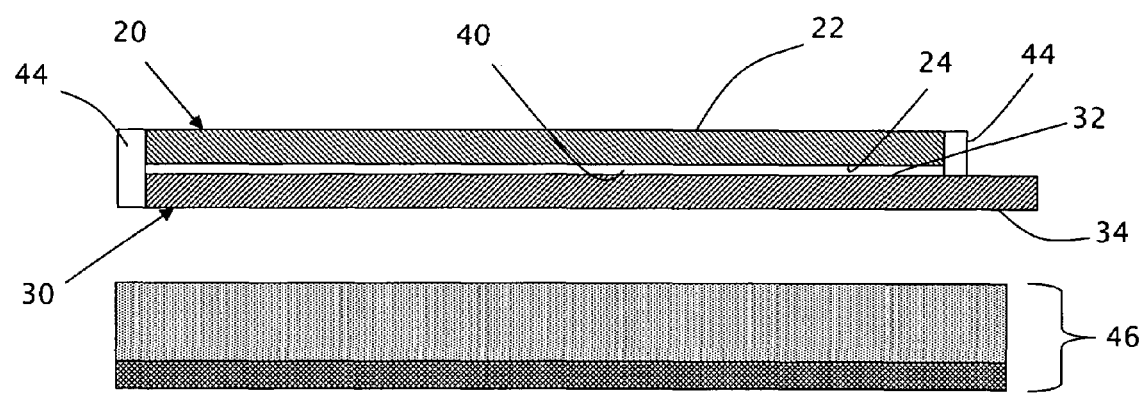
FIG. 1 is a schematic cross sectional view of a conventional LCD having two spaced glass sheets.

Referring to FIG. 1, a schematic representation of an LCD is provided, wherein glass sheets 20, 30 (shown without lamination) are separated by a gap 40 that is filled with a liquid crystal material. The edges of the sheets 20, 30 are sealed together with a low modulus polymer adhesive 44, and disposed in a relatively rigid frame (not shown). A diffuser plate 46 is spaced from the sheet 30 by a predetermined separation, wherein the diffuser plate acts as a backlight source.

The sheet 20 has an exposed surface 22 and a gap surface 24, and the sheet 30 includes a gap surface 32 and an exposed surface 34.

Figure 2:
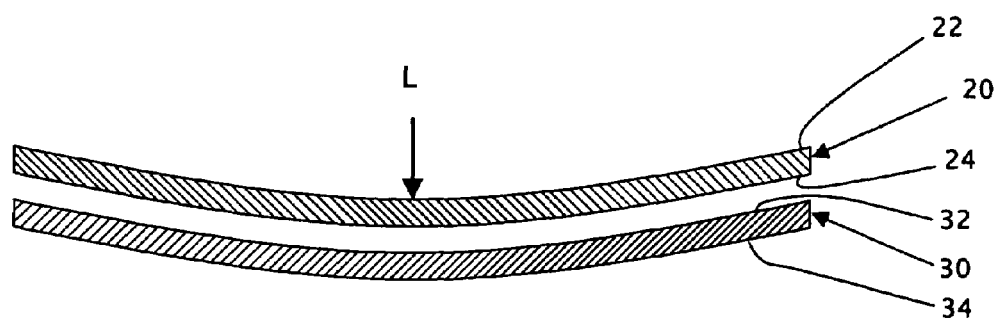
FIG. 2 is an isolated cross sectional view of the glass sheets of FIG. 1 under a loading.

Upon a loading L as shown in FIG. 2, the surfaces 22 and 32 experience compression, and are thus relatively resistant to the loading. However, the surfaces 24 and 34 are subject to increased tensile stress which can lead to failure of the sheets 20, 30 depending on the severity of the loading and inherent flaws found on the surfaces 24 and 34.

Generally, a glass sheet is broken by an impact which produces an internal strain large enough to cause cracking, and glass breakage results from tensile strain more readily than compressive strain. Therefore, breakage by impact can be generally ascribed to tensile stress. The glass laminate substrate 60 as made according to the present invention employs a residual compressive stress to at least partially counteract a tensile stress associated with a loading of the substrate. As described further below, the relationship of residual compressive and residual tensile stress in the glass laminate substrate 60 can also be selected to enhance resistance to impact and static loading without generating unacceptable levels of debris (or substrate failure) in the scribing and separating process.

The glass laminate substrate 60 of the present invention can be used in place of the glass sheets 20, 30 to provide enhanced strength at the exposed and gap surfaces, thereby increasing the ability of the resulting display to resist impact and static loading.

As shown in the example of FIG. 3, in a 3-layer configuration, the glass laminate substrate 60 includes a glass core (layer) 70 bounded by a pair of spaced glass skin layers 80, 90. The glass laminate substrate 60 is constructed to have a generally predetermined relationship of residual compressive stress in the skin layers 80, 90 and residual tensile stress in the core 70. In selected configurations, the skin layers 80, 90 are directly bonded to the glass core 70.

However, it should also be understood that intermediate layers can be located between the core 70 and the skin layers 80, 90. These intermediate layers can include, but are not limited to glass interlayers 85, 95. As seen in the example of FIG. 4, in a 5-layer configuration, the interlayers 85, 95 are located between the skin layers 80, 90 and the glass core 70, wherein the skin layers and the interlayers have a residual compressive stress and the core has a residual tensile stress. Thus, the skin layers 80, 90 can be directly, integrally, bonded to the core 70, or indirectly bonded to the core by, for example, at least one interlayer 85, 95 respectively.

In the 3-layer (the core 70 and the skin layers 80, 90) configuration of the glass laminate substrate 60, for example, the stress $\sigma_s$ in the skin layers 80, 90 can be described by equation (1):

$$\sigma_s = \left(\frac{E_c}{1-v_c}\right)\frac{(\alpha_s - \alpha_c)(T^* - 25)}{\left[\frac{t_s}{t_c} + \frac{E_c}{E_s}\left(\frac{1-v_s}{1-v_c}\right)\right]} \quad (1)$$

The stress $\sigma_c$ in the core 70 can be described by equation (2):

$$\sigma_c = \left(\frac{E_s}{1-v_s}\right)\frac{(\alpha_c - \alpha_s)(T^* - 25)}{\left[\frac{t_c}{t_s} + \frac{E_s}{E_c}\left(\frac{1-v_c}{1-v_s}\right)\right]} \quad (2)$$

Where $E_c$ and $E_s$ are the elastic moduli of the core and skin glasses, respectively; $v_c$ and $v_s$ are the Poisson's ratios of the core and skin glasses, respectively; $\alpha_s$ is the average coefficient of thermal expansion of the skin layer glass from room temperature to the setpoint (T*); $\alpha_c$ is the average coefficient of thermal expansion of the core glass from room temperature to the setpoint (T*); T* is the lower of the set points of the core and skin glasses (setpoint is defined as 5° C. above the glass strain point); $t_s$ is the thickness of each skin layer; and $t_c$ is one half the core thickness.

From equations 1 and 2, the ratio of $\sigma_s/\sigma_c$ for symmetric laminates can be written as:

$$\frac{\sigma_s}{\sigma_c} = -\frac{t_c}{t_s}, \quad (3)$$

which can be rewritten as;

$$\sigma_s t_s = -\sigma_c t_c \quad (4)$$

By selecting the appropriate coefficients of thermal expansion (CTE) for the glass of the skin layers 80, 90 and the glass of the core 70, a residual compressive stress can be formed in the skin layers and a residual tensile stress can be formed in the core.

Pursuant to equations 1 and 2, by controlling the thickness of the core 70, and the skin layers 80, 90 and their respective setpoints and CTEs, the amount of residual stress (compressive in the skin layers and tensile in the core) can be set.

Generally, the glass material of skin layers 80, 90 has a lower CTE than the CTE of the core glass material. Although one advantageous configuration employs a skin layer CTE and a core CTE that are within, approximately 35%, it is understood any of a variety of CTE differences can be employed between the skin glass and the core glass as demonstrated by the following examples.

EXAMPLE 1

| Glass | E (×10$^6$ psi) | ν | α (RT to setpoint, ×10$^{-6}$/C) | T* (C) |
|---|---|---|---|---|
| Corning Code 1737 (core 70) | 10.3 | 0.23 | 4.20 | 671 |
| Corning EAGLE$^{2000}$ ™ (skin layers 80, 90) | 10.3 | 0.23 | 3.61 | 671 |

$$\sigma_s = \frac{-5098.6}{\left[1 + \frac{t_s}{t_c}\right]}$$

$$\sigma_c = \frac{-5098.6}{\left[1 + \frac{t_c}{t_s}\right]}$$

| 2(t$_c$ + t$_s$) (mm) | t$_c$ (mm) | t$_s$ (mm) | t$_c$/t$_s$ | σ$_c$ (psi) | σ$_s$ (psi) | σ$_s$/σ$_c$ |
|---|---|---|---|---|---|---|
| 1.1 | 0.496 | 0.0539 | 9.197 | 500 | -4599 | 9.197 |
| 1.1 | 0.388 | 0.1618 | 2.399 | 1500 | -3599 | 2.399 |
| 1.1 | 0.334 | 0.2158 | 1.549 | 2000 | -3099 | 1.549 |
| 0.7 | 0.316 | 0.0343 | 9.197 | 500 | -4599 | 9.197 |
| 0.7 | 0.281 | 0.0686 | 4.099 | 1000 | -4099 | 4.099 |
| 0.7 | 0.250 | 0.1000 | 2.5 | 1457 | -3642 | 2.5 |
| 0.7 | 0.247 | 0.1030 | 2.399 | 1500 | -3599 | 2.399 |
| 0.7 | 0.15 | 0.2 | 0.75 | 2913 | -2185 | 0.75 |
| 0.4 | 0.18 | 0.0196 | 9.197 | 500 | -4599 | 9.197 |
| 0.4 | 0.161 | 0.0392 | 4.099 | 1000 | -4099 | 4.099 |
| 0.4 | 0.05 | 0.2 | 0.33 | 3824 | -1275 | 0.33 |

EXAMPLE 2

| Glass | E (×10$^6$ psi) | ν | α (RT to setpoint, ×10$^{-6}$/C) | T* (C) |
|---|---|---|---|---|
| Corning Code 7059 (core 70) | 9.8 | 0.28 | 5.01 | 598 |
| Corning EAGLE$^{2000}$ ™ (skin layers 80, 90) | 10.3 | 0.23 | 3.61 | 671 |

$$\sigma_s = \frac{-10919}{\left[1.0175 + \frac{t_s}{t_c}\right]}$$

$$\sigma_c = \frac{10731}{\left[0.983 + \frac{t_c}{t_s}\right]}$$

| 2(t$_c$ + t$_s$) (mm) | t$_c$ (mm) | t$_s$ (mm) | t$_c$/t$_s$ | σ$_c$ (psi) | σ$_s$ (psi) | σ$_s$/σ$_c$ |
|---|---|---|---|---|---|---|
| 1.1 | 0.524 | 0.0256 | 20.479 | 500 | -10240 | 20.48 |
| 1.1 | 0.499 | 0.0512 | 9.748 | 1000 | -9748 | 9.74 |
| 1.1 | 473 | 0.0767 | 6.171 | 1500 | -9257 | 6.17 |
| 0.7 | 0.334 | 0.0163 | 20.479 | 500 | -10240 | 20.48 |
| 0.7 | 0.317 | 0.0326 | 9.748 | 1000 | -9784 | 9.74 |
| 0.7 | 0.301 | 0.0488 | 6.171 | 1500 | -9257 | 6.17 |
| 0.7 | 0.285 | 0.0650 | 4.383 | 2000 | -8765 | 4.38 |
| 0.4 | 0.191 | 0.0093 | 20.479 | 500 | -10240 | 20.48 |
| 0.4 | 0.181 | 0.0186 | 9.748 | 1000 | -9748 | 9.75 |
| 0.4 | 0.172 | 0.0279 | 6.171 | 1500 | -9257 | 6.17 |

EXAMPLE 3

| Glass | E (×10$^6$ psi) | ν | α (RT to setpoint, ×10$^{-6}$/C) | T* (C) |
|---|---|---|---|---|
| Corning Code 0317 (core 70) | 10.4 | 0.22 | 9.8 | 581 |
| Corning EAGLE$^{2000}$ ™ (skin layers 80, 90) | 10.3 | 0.23 | 3.61 | 671 |

$$\sigma_s = \frac{-45888.5}{\left[0.997 + \frac{t_s}{t_c}\right]}$$

$$\sigma_c = \frac{46037.5}{\left[1.003 + \frac{t_c}{t_s}\right]}$$

| 2(t$_c$ + t$_s$) (mm) | t$_c$ (mm) | t$_s$ (mm) | t$_c$/t$_s$ | σ$_c$ (psi) | σ$_s$ (psi) | σ$_s$/σ$_c$ |
|---|---|---|---|---|---|---|
| 1.1 | 0.526 | 0.0239 | 22.016 | 2000 | -44021 | 22.01 |
| 0.7 | 0.331 | 0.0190 | 17.412 | 2500 | -43520 | 17.41 |
| 0.7 | 0.323 | 0.0266 | 12.151 | 3500 | -42517 | 12.15 |
| 0.4 | 0.191 | 0.0087 | 22.016 | 2000 | -44021 | 22.01 |

A representative glass laminate substrate 60 having elastic moduli E$_s$ and E$_c$ of 10.3×10$^6$ (pounds per square inch) psi (7.1×10$^4$ MPa), Poisson's ratios ν$_s$ and ν$_c$, of 0.22, T*=671° C., α$_c$=37.8×10$^{-7}$, α$_s$=31.8×10$^{-7}$, t$_c$=0.30 mm, and t$_s$=0.05 mm provides a residual compressive stress in the skin layer of 4,400 psi (30.3 MPa) and an internal tensile stress in the core 70 of 725 psi (5 MPa). Such laminate has a surface strength approximately 10% to 25% greater than a corresponding unlaminated core, as measured by the industry known ring-on-ring strength test. It has been observed that the internal tensile stress being less than approximately 1,000 psi (6.9 Mpa) allows the glass laminate substrate to be scribed and cut without appreciable risk of shattering or creating appreciable glass particles which can contaminate the glass surface.

It is believed that scribing and separating the glass laminate substrate 60 can be satisfactorily performed with a tensile stress as high as 4,000 psi (27.6 MPa) in the core 70, without unacceptable levels of debris generation or failure of the substrate. However, as the amount of debris generation and substrate failure decreases as the residual tensile stress in the core 70 decreases, it is desirable for the residual tensile stress in the core to be less than about 2,000 psi (13.8 MPa), and more desirably less than about 1,500 psi (10.3 MPa). It is believed a residual tensile stress in the core 70 of less than approximately 1,000 psi (6.9 MPa), and beneficially less than approximately 750 psi (5.2 MPa) allows sufficient residual compressive stress in the skin layers 80, 90 to enhance impact and static loading resistance while providing acceptable levels of debris generation and substrate failure (shatter) rates during the scribing and separating process.

Accordingly, the residual compressive stress in the skin layers 80, 90 might advantageously be in a range between approximately 3,000 to 15,000 psi (20.7 MPa to 103.4 MPa), while the tensile stress in the glass core 70 is maintained below a level which permits scribing and separating of the glass laminate substrate 60 without shattering or appreciable debris generation, such as less than approximately 4,000 psi (27.6 MPa), advantageously less than about 2,000 psi (13.8 MPa) and in select configurations less than approximately 1,500 psi (10.3 MPa).

It is understood the allowable residual tensile stress in the core 70 is at least partially determined by the particular composition of the core, as well as the glass of skin layers 80, 90, and hence the residual tensile stress can vary while providing superior results. In addition, the ratio of the absolute magnitude of the residual compressive stress to the residual tensile stress can range from approximately 2 to approximately 20, wherein the residual tensile stress is less than approximately 4,000 and even more advantageously less than 1,500 psi (10.3 Mpa).

By selecting the appropriate glass compositions and thickness ratio of the core/skin layers, the residual compressive stress in the skin layers 80, 90 can be on the order of 9,000 psi (62.01 Mpa), thereby increasing the surface strength of the glass laminate substrate 60 by approximately 50%.

Although a maximized strength of the glass laminate substrate 60 is obtained by maximizing the compressive stress in the skin layers 80, 90 (at least partially balanced by a residual tensile stress in the core 70), the release of energy in such strength maximized glass laminate substrate 60 can create substantial substrate failure rates and debris generation in the scribing and separating process. Thus, the residual compressive stress and the residual tensile stress are selected to optimally enhance resulting strength of the particular glass laminate substrate 60 without appreciable substrate failure rates or debris generation during the scribing and separating process.

For illustrative purposes and based on available literature, an estimate of fragment generation for a 50 mm×50 mm area of glass having a residual stress is given by:

$N_{50} = \beta(\sigma_c/K_{IC})^4$, where $\beta = 2.5 \times 10^{-3}$ $\alpha^2/16$ and $\sigma_c$ is the center tensile stress and $K_{IC}$ is the fracture toughness of the glass, $\alpha = 16/15\sqrt{3}(1+\nu) = 0.5$ (for Poisson's ratios of $\nu = 0.23$), $\beta = 39 \times 10^{-6}$, $N = 39 \times 10^{-6}$ $(\sigma_c/K_{IC})^4$ then for $K_{IC} = 0.75$ MPa$\sqrt{m}$ and $N = 123.2 \times 10^{-6}$ $\sigma_c^4$ per m$^2$ Thus, for different tensile stresses in such core the number N fragments is:

| $\sigma_c$ (psi) | $\sigma_c$ (MPa) | (psi) | N (# fragments/ 50 mm × 50 mm area) | N (# fragments/in²) |
|---|---|---|---|---|
| 500 | 3.45 | 500 | 0.02 | 0.005 |
| 1000 | 6.89 | 1000 | 0.28 | 0.07 |
| 1500 | 10.3 | 1500 | 1.4 | 0.35 |
| 2000 | 13.8 | 2000 | 4.5 | 1.1 |

-continued

| $\sigma_c$ (psi) | $\sigma_c$ (MPa) | (psi) | N (# fragments/ 50 mm × 50 mm area) | N (# fragments/in²) |
|---|---|---|---|---|
| 2500 | 17.2 | 2500 | 10.9 | 2.7 |
| 3000 | 20.7 | 3000 | 22.6 | 5.6 |
| 3500 | 24.1 | 3500 | 41.8 | 10.4 |
| 4000 | 27.6 | 4000 | 71.3 | 17.8 |

An exemplary three layer 1 m×1 m glass laminate substrate 60 having a thickness of 0.7 mm (a typical flat panel display dimension) has a surface area along a formed edge of slightly over 1 in² (6.45 cm²). As fractions of particles do not exist, an approximately 2000 psi (13.8 MPa) residual tensile stress in the core 70 is suggested for maintaining particle generation at or below one particle per square inch (6.45 cm²) for the scribing and separating process. It is understood, that the glass laminate substrate 60 can be constructed to provide a residual tensile stress in the core 70 of up to approximately 4,000 psi (27.6 MPa) so as to exhibit acceptable debris generation and substrate failure rates during the scribing and separating process.

A satisfactory glass material for the core 70 has been found to be Corning Code 1737 glass, and a satisfactory glass material for the skin layers 80, 90 has been found to be EAGLE²⁰⁰⁰™ glass manufactured by Corning. In selected configurations, the glasses can have a matched or identical refractive index. These materials when used in a laminate with the skin thickness of approximately 0.02 mm to 0.2 mm have been found to provide adequate protection against surface damage during handling, assembly and lifetime of the display.

For the glass laminate substrate 60 which is directed to incorporation into a display, minimization of weight is a factor. Thus, the glass laminate substrate 60 as for a flat panel display application, might have a thickness less than about 2.0 mm and may be less than approximately 1.5 mm, with a typical thickness of about 1.1 mm or less, wherein the skin layers 80, 90 (and interlayers 85, 95, if employed) and the core 70 form an at least substantially planar laminate. For portable flat panel displays, the minimization of weight is often a primary consideration, and hence the thickness of the glass laminate substrate 60 is often approximately 0.4 mm to approximately 0.6 mm. For stationary flat panel displays, such as televisions or desktop displays, the glass laminate substrate 60 may have a thickness of approximately 0.7 mm.

Typically, the total thickness of a glass laminate substrate 60 made for use in a flat panel display might be between approximately 0.4 mm and approximately 1.1 mm, wherein the thickness of the skin layers 80, 90 is selected to be between approximately 8% to 15% of the total substrate thickness, with a more optimal thickness of the skin layers being approximately 10% of the total substrate thickness. Thus, the glass laminate substrate 60 while having a thickness which is generally too small for tempering the glass, provides increased strength through the residual stresses. Therefore, the glass laminate substrate 60 can be constructed of glass that is not tempered.

The glass laminate substrate of the present invention also addresses flaw generation and flaw propagation in glass to provide the substrate with improved resistance to damage. Specifically, the glass laminate substrate 60 of the example in FIG. 3 provides the skin layers 80, 90 with residual compressive stress such that the skin layers are more resistant to damage by an amount of the residual compressive stress. For example, and without limiting the scope of the disclosure, for a glass laminate substrate 60 with a surface compressive stress in the skin layers 80, 90 of 5,000 psi (34.5 MPa), an additional 5,000 psi (34.5 MPa) stress is required to create a flaw when compared to stress required to create the same size flaw in an unlaminated glass. Therefore, the glass laminate substrate of the present invention will be less susceptible to damage during the handling/processing steps of making the flat panel display, such as an LCD. Further, the residual stress results in a permanent strengthening effect of the glass laminate substrate 60. That is, to create the same level of tensile stress required to drive a crack in the glass laminate substrate 60 will require a stress in excess of the residual compressive stress in the skin layer. Again, using the present example of a 5000 psi (34.5 MPa) residual compressive stress in the skin layer, a 5000 psi (34.5 MPa) excess tensile stress is required to drive a crack across the laminated glass substrate than across an unlaminated glass.

Typically, each skin layer 80, 90 comprises the same material and thickness, thereby providing a symmetrical stress about the core 70. Similarly, in the 5-layer configuration, each interlayer 85, 95 comprises the same material and thickness thereby providing symmetrical stress about the core 70. That is, the residual compressive stress in the skin layers 80, 90 (or within the interlayers 85, 95) can be substantially equal. However it should be understood that the skin layers 80, 90 (and/or interlayers 85, 95) on a given core 70 can be of different material, CTE or thickness, which may be advantageous for applications where there is asymmetric loading. For example, by doubling the thickness of one skin layer, the glass laminate substrate 60 can exhibit an increased resistance to bending in a horizontal orientation, such as rack storage. In such an asymmetric design, the residual stress can result in a preferential bending upon being disposed in the vertical orientation. Accordingly, cooperating glass laminate substrates 60 can be fixedly held by a frame to overcome, or compensate for such asymmetric residual stress. Thus, an asymmetric residual stress in the skin layers can be set at a predetermined level, such as for example, approximately 10%. In one configuration, the residual compressive stress in the skin layers 80, 90 is within approximately 20%, advantageously within approximately 10% such as within approximately 5% of each other.

In the configuration of the glass laminate substrate 60 which includes the interlayers 85, 95 (such as exemplified in FIG. 4), the tensile stress in the glass core 70 can be further limited without negatively affecting the residual compressive stress in the skin layers 80, 90. Example 4 is a representative construction of the 5-layer configuration seen in FIG. 4.

EXAMPLE 4

For the interlayer configuration, let k=E/(1−v).

| Glass | E (×10$^6$ psi) | v | k (×10$^6$ psi) | α (RT to setpoint, ×10$^{-6}$/C) | T* (C) | ΔL/L @556° C. (ppm) |
|---|---|---|---|---|---|---|
| Corning Code 0317 (core 70) | 10.4 | 0.22 | 13.33 | 9.8 | 581 | 5449 |

-continued

| Glass | E (×10$^6$ psi) | v | k (×10$^6$ psi) | α (RT to setpoint, ×10$^{-6}$/C) | T* (C) | ΔL/L @556° C. (ppm) |
|---|---|---|---|---|---|---|
| Corning Code 7059 (interlayer 85, 95) | 9.8 | 0.28 | 13.61 | 5.01 | 598 | 2785 |
| Corning EAGLE2000™ (skin layers 80, 90) | 10.3 | 0.23 | 13.38 | 3.61 | 671 | 2007 |

An advantage of including the interlayers 85, 95 in the glass laminate substrate 60 lies in the ability to maintain a relatively large residual compressive stress in the skin layers 80, 90 while reducing the residual tensile stress in the core 70.

The values of compressive stress relate to the respective thicknesses of the interlayer 85, 95 and skin layer 80, 90 relative to that of the glass core 70. The final stresses in the 5-layer glass laminate substrate 60 are given by:

$$\sigma_c = k_c(e_c - e_o)$$

$$\sigma_i = k_i(e_i - e_o)$$

$$\sigma_s = k_s(e_s - e_o)$$

where e refers to the ΔL/L of each glass at the lowest setpoint temperature and the subscripts c, i, and s refer to the core, interlayer, and skin glasses respectively. Thus, $e_o$ is given by:

$$e_o = \frac{t_c k_c e_c + t_i k_i e_i + t_s k_s e_s}{t_c k_c + t_i k_i + t_s k_s}$$

For example, the case where the total thickness of the laminate is 0.7 mm, and the interlayer 85, 95 and skin 80, 90 thicknesses are both 0.0133 mm (same as the configuration in Example 3):

$t_c$=0.3234 mm $e_o$=5215×10$^{-6}$ $\sigma_c$=(5449−5215)×13.33=3119 psi (21.5 Mpa) (tension in core)

$\sigma_i$=(2785−5215)×13.61=−33072 psi (227.9 MPa) (compression in interlayer)

$\sigma_s$=(2007−5215)×13.38=−42923 psi (295.7 MPa) (compression in skin)

Hence, the 5-layer 3-glass laminate substrate 60 has 11% lower core tension and 11% lower compression in the interlayers 85, 95 compared with a 3 layer 2-glass laminate comprising a Corning Code 0317 glass core 70 and skin layers 80, 90 of EAGLE2000™ glass by Corning, while the compression in the skin layers is 1% higher. Thus, the 5-layer 3-glass system with interlayers 85, 95 offers the advantage of significantly reducing the tensile stress in the core 70 while preserving the compressive stress in the skin layers 80, 90. The reduced internal tensile stress in the core 70 assists in reducing shattering and debris generation during the scribing and separating process.

As stated in connection with the 3-layer configurations of the glass laminate substrate 60, by controlling the thickness of the core 70, the interlayers 85, 95 and the skin layers 80, 90; and the respective setpoints and the respective CTE, the amount of residual stress (compressive in the skin layers and interlayers and tensile in the core) can be set by design. That is, the amount of residual stress (compressive in the skin layers 80, 90 and interlayers 85, 95 and tensile in the core 70) can be substantially predetermined.

The residual stresses in the glass laminate substrate 60 are formed through bonding the multiple layers together at a temperature above the lowest setpoint of the constituent layer glasses. Advantageously, lamination will occur during the forming of the molten glass into a sheet form so as to achieve a sufficient bond between adjacent layers (such as the core 70 to the skin layers 80, 90, or the interlayers 85, 95 to the core and the skin layers). For those skilled in the art of glass forming, it is known that there are multiple methods to achieve such a structure, such as laminated down draw and laminated fusion processes.

Generally, fusion drawing of the skin (and interlayer) glass and the core glass is a satisfactory method for formation of the glass laminate substrate 60. However, it is understood that alternative methods such as slot drawing, double slot drawing or other suitable bonding methods could be used to form the glass laminate substrate 60. The glass material of the core 70 and the skin layers 80, 90 (and the interlayers 85, 95) is selected to provide a compatible viscosity to form a substantially transparent and distortion free interface.

In a typical laminated down draw or slot process, molten glass is delivered to a slot orifice made from a refractory metal such as platinum. A laminated down draw apparatus has multiple slot orifices located parallel to each other and the ability to deliver different molten glass streams to each orifice. The fluid nature of the glass at this forming condition (typically 100,000 poises), causes the multiple glass streams to fuse together upon exiting the orifices, forming a monolithic glass sheet of differing layers. Thicknesses of the multiple layers are controlled by the dimensions of the individual slot orifices. It is understood downstream rollers can contact the glass sheets to assist the bonding of the layers.

Generally, in the laminated fusion process, as described in U.S. Pat. No. 4,214,886, the disclosure of which being hereby expressly incorporated herein by reference, the glass laminate substrate 60 is formed with a controllable overflow distribution system and a forming member, such that the core 70 and skin layers 80, 90 (and glass interlayers 85, 95) flow concurrently along a forming member until cooling to a viscosity suitable for forming a single glass laminate substrate with the desired thicknesses.

Figure 5:
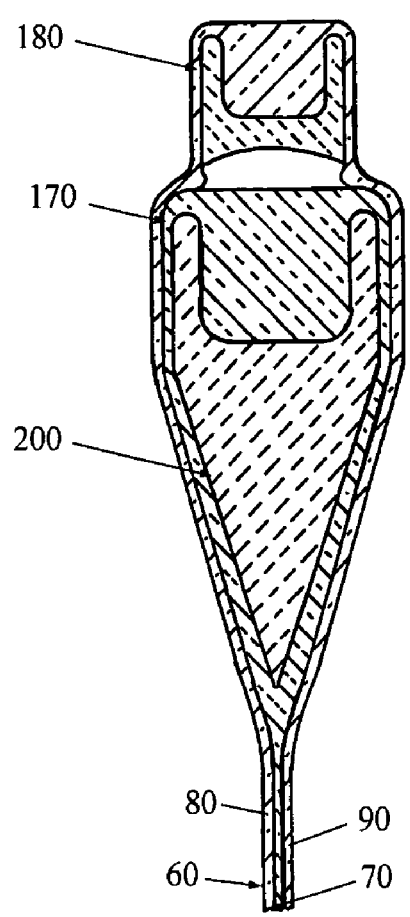
FIG. 5 is a cross sectional view of an overflow distributor system and forming members for creating a glass laminate substrate.

Referring to FIG. 5 for an example of a symmetric forming process, the glass which forms the core 70 and the glass which forms the skin layers 80, 90 are separately melted and delivered through an appropriate delivery system to a corresponding overflow distributor 170, 180 respectively. The overflow distributor 180 is mounted above the overflow distributor 170 so that the glass from the overflow distributor 180 flows over top edge portions of the overflow distributor 180 and down the sides to form a uniform flow layer of appropriate thickness on both sides of the overflow distributor 180 below such top edge portions.

The bottom overflow distributor 170 has a wedge-shaped forming member 200 associated therewith. The forming member 200 has converging sidewall portions which communicate at their top end with the sidewalls of the overflow distributor 170 and terminate at their converging bottom ends in a draw line. The molten glass overflowing the bottom overflow distributor 170 flows downwardly along the distributor walls and forms an initial glass flow layer adjacent to the converging outer surfaces of the forming member 200, whereas the molten glass overflowing the distributor 180 from above flows downwardly over the upper distributor walls and flows over outer surface portions of the core layer, thereby creating a laminated glass stream. The two individual layers of glass from each converging sidewall of the forming member 200 are brought together and fused at the draw line to form a single continuous laminate. The two layers of the core glass fuse to form the core 70, which separates the layers of skin glass.

In a 3-layer configuration, the residual stress derives from the difference in the CTE between the skin layers 80, 90 and the core 70 and the respective setpoints. The skin glass and core glass bond at an elevated temperature, and as the materials cool to ambient temperature, the skin glass (lower CTE) tends to contract less than the core glass (higher CTE). As the layers are bonded, a compressive stress is generated in skin layers 80, 90 and a tensile stress is generated in the core 70.

Figure 6:
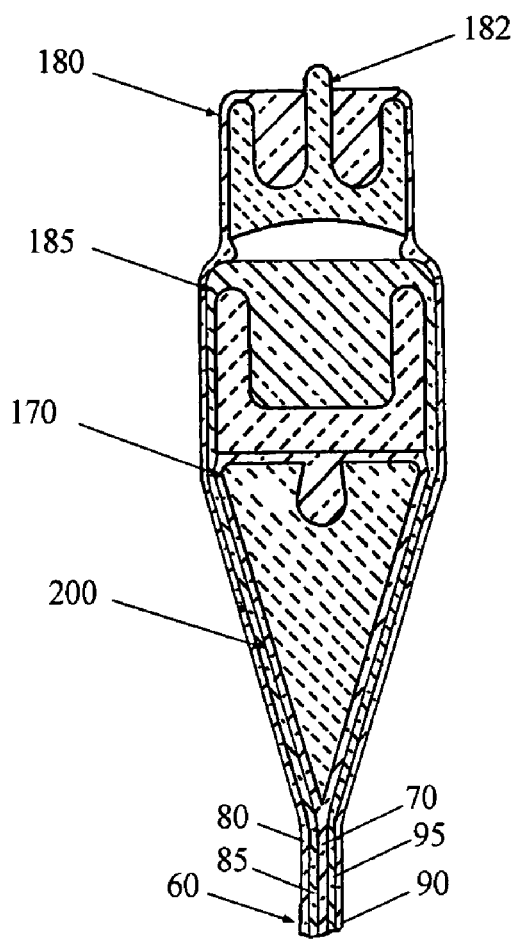
FIG. 6 is a cross sectional view of an alternative overflow distributor system and forming members for creating a further configuration of a glass laminate substrate.

As seen in FIG. 6, additional layers, such as the interlayers 185, 195, can be incorporated in the glass laminate substrate 60, by stacking additional overflow distributors and associated forming members (and their respective glass delivery systems). The 5-layer glass laminate substrate 60 illustrated in FIG. 4 can thus be formed by the system shown in FIG. 6, wherein overflow distributor 180 (forming the skin layers 80, 90) is above overflow distributor 185 (forming the interlayers 185, 195) which in turn is above the overflow distributor 170 (forming the core 70).

Also referring to FIG. 6, the overflow distributor 180 can include a central wall 182 to allow two different glasses to issue from the distributor, thereby forming skin layer 80 of a different material than the skin layer 90. Although the overflow distributor 180 is shown with the central wall 182, it should be understood that the overflow distributor 185 can alternatively include the central wall, thereby providing for the interlayers 185 and 195 to be of different materials.

Asymmetric layer thicknesses are achievable by adjusting the relative glass flow over the two sides of any given overflow distributor (and associated forming member) such as by tilting the forming member or employing a varying of different flow rate, or a combination thereof.

The dimensional control and resulting pristine glass surface conditions make the fusion, or overflow process, a satisfactory method for making the glass laminate substrate 60.

In the manufacturing process for the example of the 5-layer configuration of the glass laminate substrate 60, the skin glass, EAGLE$^{2000}$™ glass from Corning will set up first and contract free of stress. The glass, Corning Code 0317, of the core 70 is the softest glass of the glass laminate substrate 60 and has a setpoint of 581° C., and hence no stress is set up in the core glass until the core glass cools to 581° C. However, the interlayer glass, Corning Code 7059, has a setpoint of 598° C. so the interlayer glass will set up before the core glass and experience tension while inducing compression in the skin glass as the laminate 60 is cooling from 598° C. to 581° C. At approximately 581° C., the core glass begins to set up which, due to the core glass having the highest CTE value, will experience the most tension and induce net compression in both the interlayers 85, 95 and the skin layers 80, 90.

Once the glass laminate substrate 60 is formed, any of a variety of layers, coatings or films, including functional layers can be applied to the glass laminate substrate. While these additional layers do not typically have a significant residual compressive or tensile stress, as discussed herein the skin layers 80, 90 (and the interlayers 85, 95 if employed) can be constructed to compensate for these subsequent layers deposited on the substrate. For example, the thickness (or materials) of the skin layers 80, 90 and/or interlayers 85, 95 can be selected to create compensating residual stresses to accommodate such additional layers. Thus, the glass laminate substrate 60 can be formed to exhibit an unbalanced surface compressive stress, such that subsequent layers tend to equalize the compressive stress on opposite surfaces of the core 70.

While the invention has been described in conjunction with specific exemplary embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A laminate substrate comprising:
   (a) a transparent glass skin layer having a skin layer coefficient of thermal expansion and a skin layer setpoint, the skin layer having a skin layer residual compressive stress;
   (b) a transparent glass core having a core coefficient of thermal expansion and a core setpoint, the core having a core residual tensile stress;
   (c) a transparent glass interlayer adjacent to the glass skin and intermediate the glass skin layer and the glass core, the interlayer having an interlayer residual compressive stress, the interlayer having an interlayer coefficient of thermal expansion and an interlayer setpoint;
      the interlayer coefficient of thermal expansion being less than the skin layer coefficient of thermal expansion and greater than the core coefficient of thermal expansion.

2. The laminate substrate of claim 1, wherein the glass core has a residual tensile stress less than approximately 4,000 psi and the glass skin layers have a residual compressive stress greater than approximately 1,000 psi.

3. The laminate substrate of claim 1, wherein the glass core has a residual tensile stress less than approximately 4,000 psi and the glass skin layers have a residual compressive stress greater than approximately 10,000 psi.

4. The laminate substrate of claim 1, wherein the interlayer setpoint is less than the skin layer setpoint and greater than the core setpoint.

5. A laminate substrate comprising:
   (a) a pair of spaced transparent alkali free glass skin layers having a first coefficient of thermal expansion; and
   (b) a transparent alkali free glass core intermediate the glass skin layers, the transparent glass core having a higher second coefficient of thermal expansion,
      the glass skin layers having a residual compressive stress greater than approximately 1,000 psi and the glass core having a residual tensile stress less than approximately 4,000 psi.

6. The laminate substrate of claim 5, wherein the residual compressive stress in at least one of the glass skin layers is greater than 2,000 psi.

7. The laminate substrate of claim 5, wherein the residual compressive stress in at least one of the glass skin layers is greater than 3,000 psi.

8. The laminate substrate of claim 5, wherein the residual compressive stress in at least one of the glass skin layers is greater than 4,000 psi.

9. The laminate substrate of claim 5, wherein the first coefficient of thermal expansion is within 50% of the second coefficient of thermal expansion.

10. The laminate substrate of claim 5, wherein the substrate is substantially planar.

11. The laminate substrate of claim 5, wherein the glass skin layers and the glass core have a combined thickness of less than 2.5 mm.

12. The laminate substrate of claim 5, wherein the glass skin layers and the glass core have a combined thickness of less than 1.5 mm.

13. The laminate substrate of claim 5, wherein the glass core is directly bonded to the glass skin layers.

14. The laminate substrate of claim 5, wherein the glass core is indirectly bonded to the glass skin layers.

15. The laminate substrate of claim 5, wherein the ratio of the absolute magnitude of the residual compressive stress to residual tensile stress is between approximately 2 and approximately 20.

16. The laminate substrate of claim 5, wherein the residual compressive stress is between about 3,000 and about 15,000 psi.

17. The laminate substrate of claim 5, wherein the residual tensile stress is sufficient to permit scribing and separating of the laminate substrate without shattering the laminate substrate.

18. The laminate substrate of claim 5, wherein the residual tensile stress is sufficient to permit scribing and separating of the laminate substrate without detrimental debris generation.

19. The laminate substrate of claim 5, wherein the residual compressive stress in one glass skin layer is within 20% of the residual compressive stress in a remaining glass skin layer.

20. The laminate substrate of claim 5, wherein the residual compressive stress in one glass skin layer substantially equals the residual compressive stress in the other glass skin layer.

21. The laminate substrate of claim 5, wherein the residual compressive stress in one glass skin layer differs by at least approximately 10% from the residual compressive stress in the other glass skin layer.

22. The laminate substrate of claim 5, further comprising an interlayer intermediate the glass core and at least one glass skin layer.

23. The laminate substrate of claim 22, wherein the interlayer has a setpoint greater than the glass core and less than the at least one glass skin layer.

24. The laminate substrate of claim 22, wherein the interlayer has a coefficient of thermal expansion greater than the at least one glass skin layer and less than the glass core.

25. The laminate substrate of claim 5, wherein the residual tensile stress in the glass core is less than 2000 psi.

26. The laminate substrate of claim 5, wherein the residual tensile stress in the glass core is less than 1500 psi.

27. The laminate substrate of claim 3, wherein the residual tensile stress in the glass core is less than 1000 psi.

28. The laminate substrate of claim 3, wherein the substrate has a fragment generation during scribing and separating of less than approximately 18 fragments per square inch.

29. The laminate substrate of claim 3, wherein the glass skin layers have a higher setpoint than the glass core.

* * * * *